(12) United States Patent
Kondo

(10) Patent No.: US 11,588,336 B2
(45) Date of Patent: Feb. 21, 2023

(54) METHODS AND APPARATUS FOR A BATTERY SYSTEM

(71) Applicant: SEMICONDUCTOR COMPONENTS INDUSTRIES, LLC, Phoenix, AZ (US)

(72) Inventor: Hideo Kondo, Oizumi-machi (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 148 days.

(21) Appl. No.: 16/948,808

(22) Filed: Oct. 1, 2020

(65) Prior Publication Data

US 2021/0391740 A1    Dec. 16, 2021

Related U.S. Application Data

(60) Provisional application No. 62/705,201, filed on Jun. 16, 2019.

(51) Int. Cl.
*H02J 7/00* (2006.01)

(52) U.S. Cl.
CPC ........ *H02J 7/00302* (2020.01); *H02J 7/0048* (2020.01); *H02J 7/00306* (2020.01); *H02J 7/007182* (2020.01); *H02J 7/00304* (2020.01); *H02J 7/00308* (2020.01)

(58) Field of Classification Search
USPC .......................................................... 320/134
See application file for complete search history.

(56) References Cited

U.S. PATENT DOCUMENTS

| | | | |
|---|---|---|---|
| 2005/0127879 A1* | 6/2005 | Sato | H02J 7/007194 320/134 |
| 2009/0085519 A1 | 4/2009 | Kim | |
| 2011/0156655 A1* | 6/2011 | Kim | H02J 7/0031 320/134 |
| 2014/0253041 A1* | 9/2014 | Takeda | H02J 7/0029 320/134 |
| 2016/0156214 A1* | 6/2016 | Yoon | H02J 7/00308 320/134 |
| 2017/0047618 A1* | 2/2017 | Suzuki | H02J 7/00712 |
| 2017/0367726 A9 | 12/2017 | Smith | |

OTHER PUBLICATIONS

Sam Davis, Power Management Chapter 9: Battery-Power Management ICs; online article, May 17, 2018, Power Electronics.
On Semiconductor, 1-Cell Lithium-Ion Battery Protection IC with Integrated Power MOS FET, data sheet, LC05132C01NMT, Revision 2, Nov. 2016.

* cited by examiner

Primary Examiner — Samuel Berhanu
(74) Attorney, Agent, or Firm — Dickinson Wright PLLC

(57) ABSTRACT

Various embodiments of the present technology may provide methods and apparatus for a battery system. The apparatus may provide a protection control circuit to detect undesired battery conditions and a fuel gauge circuit to confirm the detected battery condition, record the detected condition, and report the recorded conditions.

19 Claims, 7 Drawing Sheets

METHODS AND APPARATUS FOR A BATTERY SYSTEM

CROSS-REFERENCE TO RELATED APPLICATIONS

This application claims the benefit of U.S. Provisional Patent Application No. 62/705,201, filed on Jun. 16, 2020, the entire contents of which is incorporated herein by reference.

BACKGROUND OF THE TECHNOLOGY

Host systems within an electronic device may be powered by a battery. In many cases, the electronic device also includes a protection circuit that monitors the battery for undesired conditions, such as over-voltage (excessively high voltage), under-voltage (excessively low voltage), over-current (excessively high current), and under-current (short circuit). Depending on the type of detected condition, the protection circuit may disable charging or discharging of the battery. In conventional systems, the protection circuit operates independently from the host system and, thus, the host system is "unaware" of any undesired conditions detected by the protection circuit.

SUMMARY OF THE INVENTION

Various embodiments of the present technology may provide methods and apparatus for a battery system. The apparatus may provide a protection control circuit to detect undesired battery conditions and a fuel gauge circuit to confirm the detected battery condition, count and record the detected conditions, and report the recorded conditions.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 6:
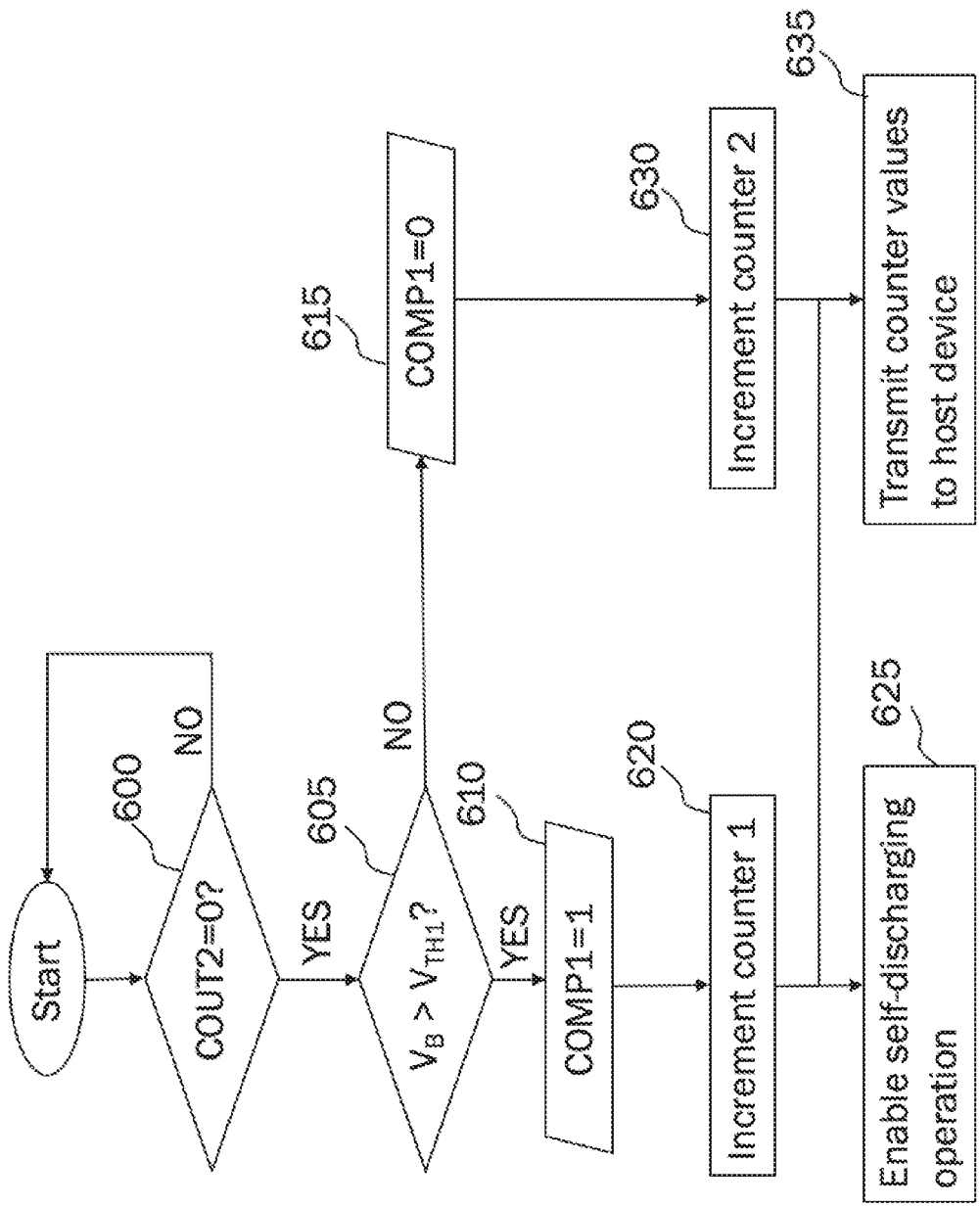
Figure 7:
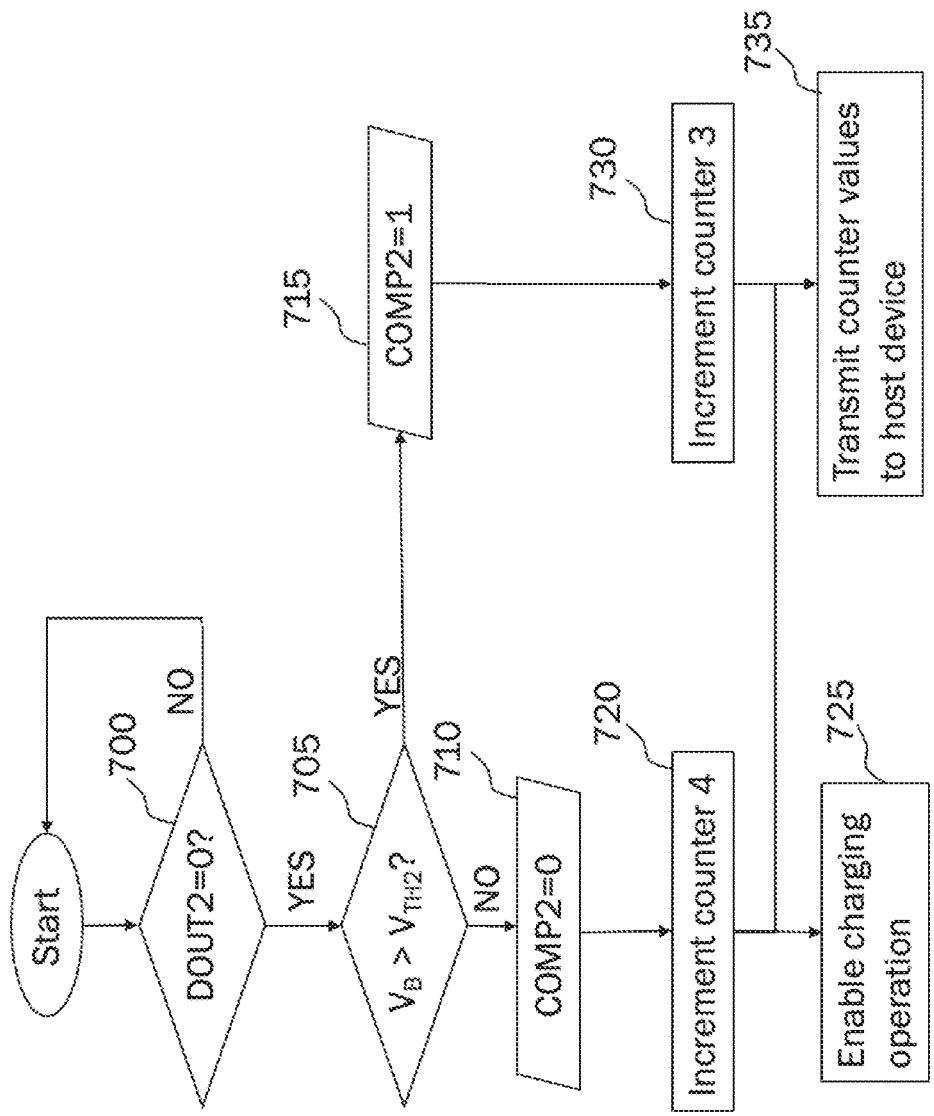

FIG. 6 is a flow chart for determining whether the battery is experiencing a type-1 over-charge event or a type-2 over-charge event in accordance with an exemplary embodiment of the present technology; and FIG. 7 is a flow chart for determining whether the battery is experiencing a type-1 over-discharge event or a type-2 over-discharge event in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various voltage sensors, current sensors, coulomb counters, logic gates, timers, memory devices, switches, semiconductor devices, such as transistors and capacitors, and the like, which may carry out a variety of functions. In addition, the present technology may be integrated in any number of electronic systems, such as automotive, aviation, "smart devices," portables, e-cigarettes, aroma therapy puff systems, vaping devices, and consumer electronics, and the systems described are merely exemplary applications for the technology.

Figure 1:
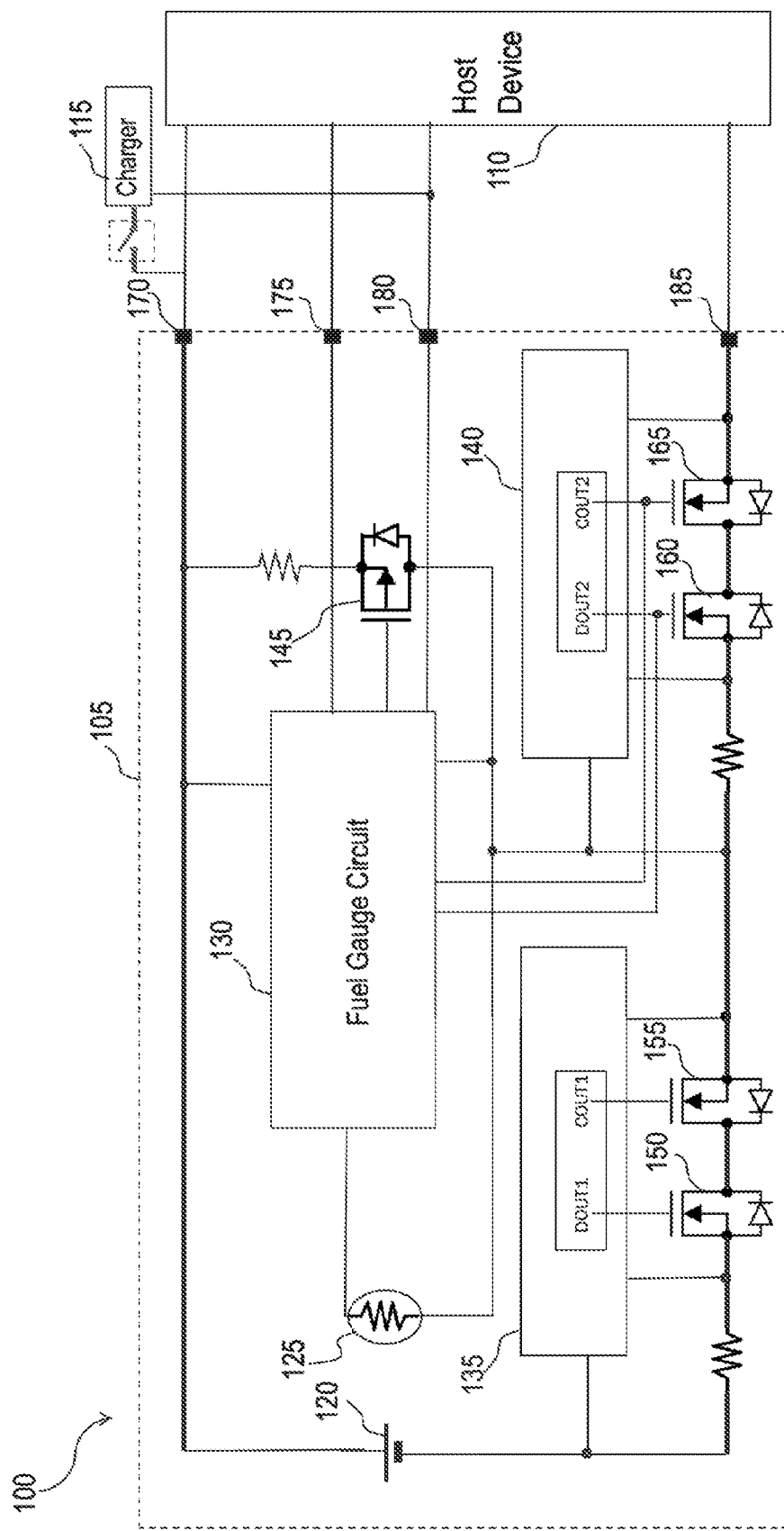
FIG. 1 is a block diagram of a battery system in accordance with an exemplary embodiment of the present technology.
Figure 2:
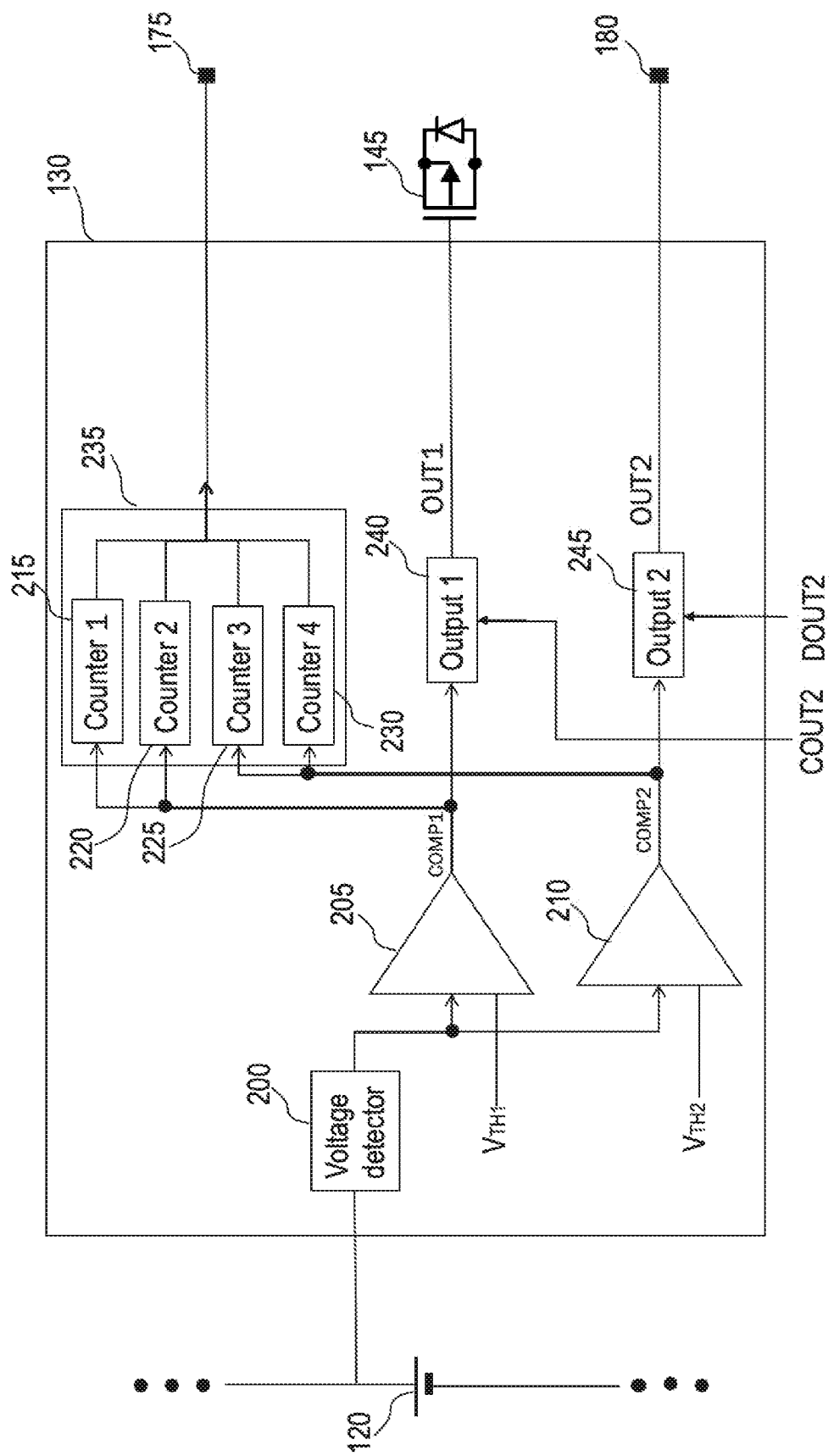
FIG. 2 is a block diagram of a fuel gauge circuit in accordance with an exemplary embodiment of the present technology.
Figure 3:
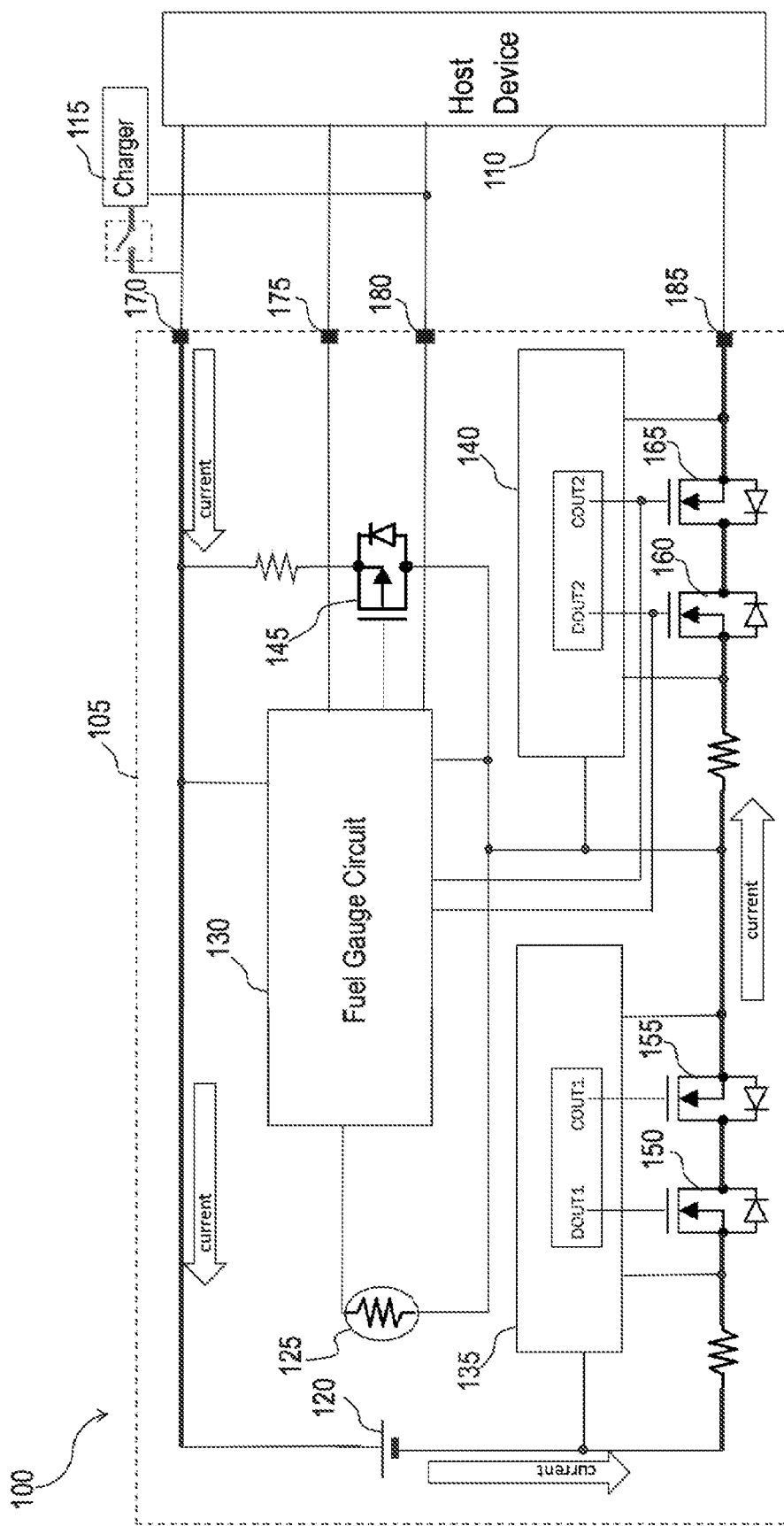
FIG. 3 is a block diagram of the battery system during a normal charging operation and in accordance with an exemplary embodiment of the present technology.
Figure 4:
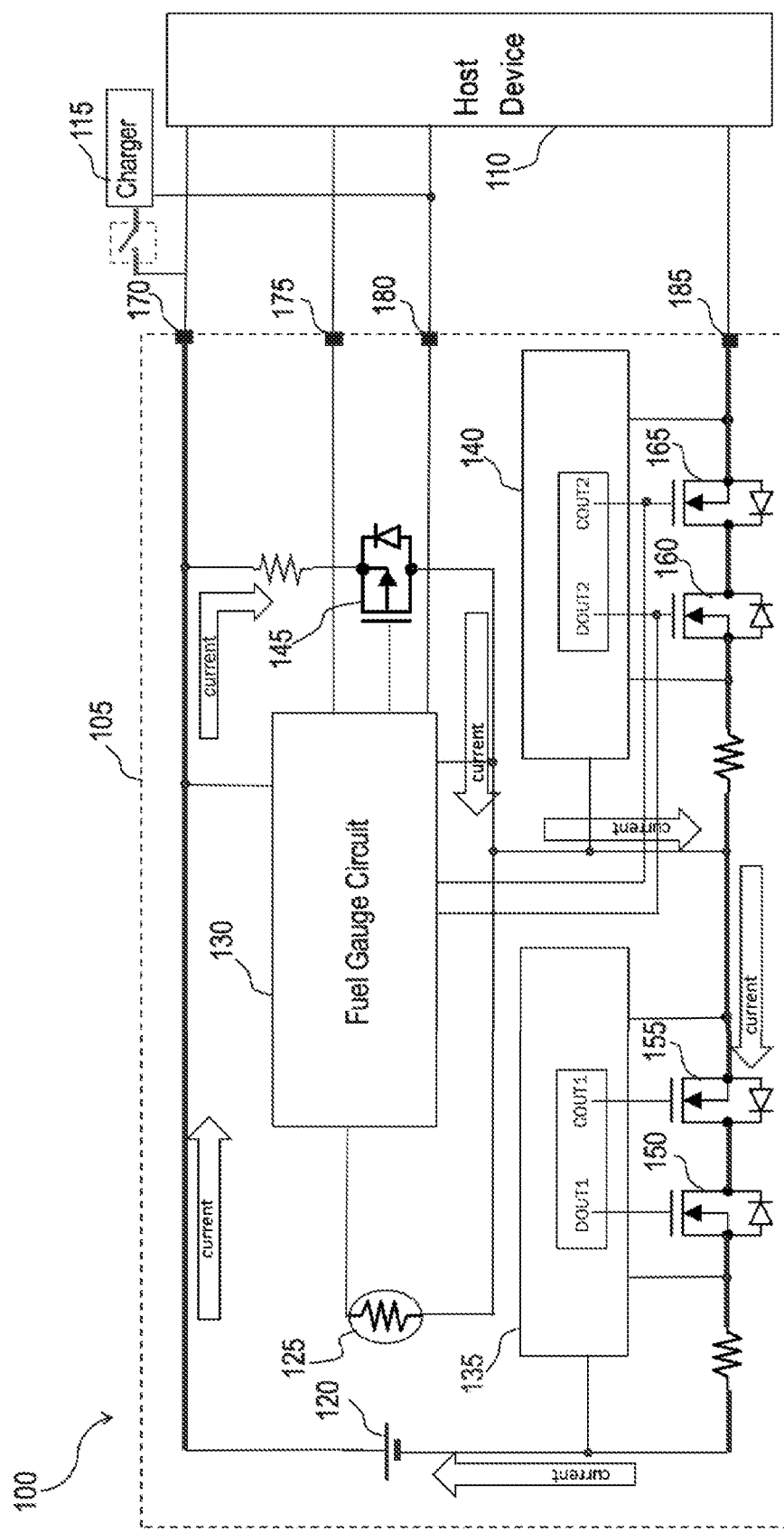
FIG. 4 is a block diagram of the battery system during a self-discharging operation and in accordance with an exemplary embodiment of the present technology.
Figure 5:
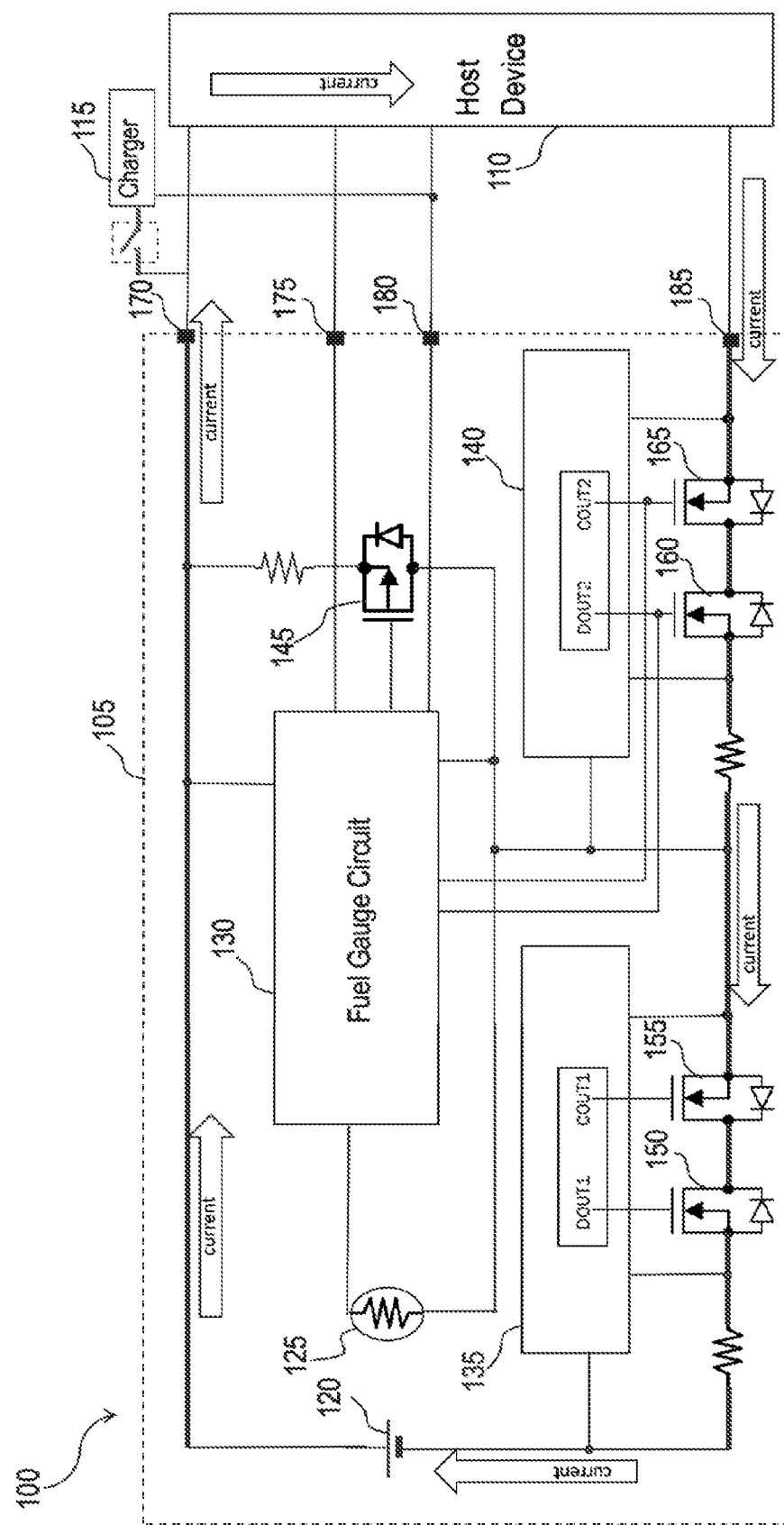
FIG. 5 is a block diagram of the battery system during a normal discharging operation and in accordance with an exemplary embodiment of the present technology.

Methods and apparatus for a battery system according to various aspects of the present technology may operate in conjunction with any suitable electronic system and/or device, such as "smart devices," wearables, battery-powered consumer electronics, portable devices, battery-powered vehicles, and the like. Referring to FIG. 1, a system 100 may be integrated in an electronic device (not shown), such as a smart watch or an electric vehicle, powered by a rechargeable battery 120, such as a lithium ion battery. For example, in various embodiments, the system 100 may comprise the battery pack 105, a charger 115, and a host device 110 (i.e., a load), wherein the battery pack 105 may operate in conjunction with the charger 115 to provide power to the rechargeable battery 120.

In various embodiments, the battery pack 105 may provide power to the host device 110 and monitor various conditions of the battery 120, such as over-voltage (excessive voltage), under-voltage, over-current (excessive current), and under-current (short circuit). If a particular condition/event is detected, the battery pack 105 may be configured to initiate a charging operation and initiate a self-discharging operation. In addition, the battery pack 105 may be configured to count and record the number of detected conditions and report the number to the host device 110. In an exemplary embodiment, the battery pack 105 may comprise the battery 120, a fuel gauge circuit 130, and a recovery control device 145.

In various embodiments, the battery pack 105 may further comprise at least one protection control circuit configured to detect over-charge events and over-discharge events. In an exemplary embodiment, the battery pack 105 may comprise a first protection control circuit 135 and a second protection control circuit 140, wherein each protection control circuit operates independently from the other and independently monitors for over-charge events and over-discharge events. In various embodiments, each protection control circuit 135, 140 may comprise various circuitry to detect voltage and current.

In an exemplary embodiment, the over-charge events comprises over-current charging (i.e., excessively high current during a charging operation, and referred to as a type-2 over-charge event) and over-voltage charging (i.e., excessively high battery voltage during a charging operation, and referred to as a type-1 over-charge event). The over-discharge events comprises over-current discharging (i.e., excessively high current during a discharging operation, and referred to as a type-2 over-discharge event) and under-voltage discharging (i.e., excessively low voltage during a discharging operation, and referred to as a type-1 over-discharge event).

In an exemplary embodiment, the battery pack 105 may further comprise a number of charge/discharge control devices that are configured to control current through the battery pack 105. For example, battery pack 105 may comprise a first discharge control device 150 and a first charge control device 155 that are controlled by the first protection control circuit 135 via a first control signal COUT1 and a second control signal DOUT1. The first control signal COUT1 may have a value of 0 or a value of 1. When COUT1=1, the first charge control device 155 is ON, and when COUT1=0, the first charge control device 155 is OFF. Similarly, the second control signal DOUT1 may have a value of 0 or 1. When DOUT1=1, the first discharge control device 150 is ON, and when DOUT1=0, the first discharge control device 150 is OFF.

In an exemplary embodiment, if the first protection control circuit 135 detects a high current or a high voltage during a charging operation, the first protection control circuit 135 generates COUT1=0 to disable (turn OFF) the first charge control device 155, thus preventing current from flowing from the battery pack 105 to the host device 110. If the first control circuit 135 detects a high current or a low voltage during a discharging operation, the first protection control circuit 135 may generate a DOUT1=0 to disable the first discharge control device 150, thus preventing current from flowing from the host device 110 to the battery pack 105.

The battery pack 105 may further comprise a second discharge control device 160 and a second charge control device 165 that are controlled by the second protection control circuit 140 via a first control signal COUT2 and a second control signal DOUT2. The first control signal COUT2 may have a value of 0 or a value of 1. When COUT2=1, the second charge control device 165 is ON, and when COUT2=2, the second charge control device 165 is OFF. Similarly, the second control signal DOUT2 may have a value of 0 or 1. When DOUT2=1, the second discharge control device 160 is ON, and when DOUT2=0, the second discharge control device 160 is OFF.

In an exemplary embodiment, if the second protection control circuit 140 detects a high current or a high voltage during a charging operation, the second protection control circuit 140 generates COUT2=0 to disable (turn OFF) the second charge control device 165, thus preventing current from flowing from the battery pack 105 to the host device 110. If the second control circuit 140 detects a high current or a low voltage during a discharging operation, the second protection control circuit 140 may generate DOUT2=0 to disable the second discharge control device 160, thus preventing current from flowing from the host device 110 to the battery pack 105.

In an exemplary embodiment, each of the first and second charge control devices 155, 165 and the first and second discharge control devices 150, 155 may comprise any switch device suitable for enabling/disabling current flow, such as a field-effect transistor or the like. In an exemplary embodiment, each of the first and second charge control devices 155, 165 and the first and second discharge control devices 150, 155 comprise an n-type FET.

In an exemplary embodiment, the battery pack 105 may further comprise a plurality of terminals, such as a first terminal 170, a second terminal 175, a third terminal 180, and a fourth terminal 185. Each terminal may be configured as an input/output (I/O) terminal. The first terminal 170 may have a supply voltage level VDD and connect to the battery 120, the fuel gauge circuit 130, and the recovery control device 145. The second terminal 175 may be configured for data communication and connect to the fuel gauge circuit 130. The third terminal 180 may be configured to connect the fuel gauge circuit 130 to the charger 115. The fourth terminal 185 may have reference voltage level VSS and connect to the protection control circuit.

In an exemplary embodiment, the battery 120, the fuel gauge circuit 130, and the first and second protection control circuits 135, 140 are arranged in a single, physical package, wherein each of the battery 120, the fuel gauge circuit 130, and the first and second protection control circuits 135, 140 are accessible only through the battery pack terminals 170, 175, 180, 185.

The fuel gauge circuit 130 may be configured to manage various battery operations and monitor various battery conditions. For example, the fuel gauge circuit 130 may be configured to measure a voltage $V_B$ of the battery 120, measure a current of the battery 120, compute a remaining capacity (also expressed as a percentage and referred to as the state of charge SOC) of the battery 120, compute a state of health (SOH) of the battery 120, estimate a lifespan of the battery 120, determine an energy capability of the battery 120, and the like.

In an exemplary embodiment, the fuel gauge circuit 130 may be in communication with at least one of the protection control circuits, such as a second protection control circuit 140. For example, the fuel gauge circuit 130 may receive various control signals from the second protection control circuit 140.

In an exemplary embodiment, the fuel gauge circuit 130 may independently confirm (or verify) over-charge events and over-discharge events that are detected by the second protection control circuit 140. The fuel gauge circuit 130 may also determine whether the over-charge event is the type-1 over-charge event or the type-2 over-charge event. Similarly, the fuel gauge circuit 130 may determine whether the over-discharge event is the type-1 over-discharge event or the type-2 over-discharge event. In an exemplary embodiment, the fuel gauge circuit 130 may confirm over-charge events and over-discharge events using a combination of a voltage detector 200 and a plurality of comparators.

In an exemplary embodiment, the fuel gauge circuit 130 may count and record a total number of each confirmed event using a memory 235.

In an exemplary embodiment, the fuel gauge circuit 130 may comprise a voltage detector 200 configured to measure the voltage $V_B$ of the battery 120. The voltage detector 200 may be configured to measure or otherwise detect the voltage $V_B$ of the battery 120. The voltage detector 200 may be connected to the battery 120 and may comprise any circuit and/or device suitable for measuring a voltage potential of the battery 120.

The fuel gauge circuit 130 may comprise a plurality of comparators, such as a first comparator 205 and a second comparator 210. The first comparator 205 may be configured to receive the measured battery voltage $V_B$ and compare the battery voltage $V_B$ to a first threshold voltage $V_{TH1}$. The first comparator 205 may generate a first comparator output that indicates the result of the comparison. For example, if the battery voltage $V_B$ is greater than the first threshold voltage $V_{TH1}$, then the first comparator 205 may output a digital 1. Conversely, if the battery voltage $V_B$ is less than the first threshold voltage $V_{TH1}$, then the first comparator 205 may output a digital 0.

The second comparator 210 may be configured to receive the measured battery voltage $V_B$ and compare the battery voltage $V_B$ to a second threshold voltage $V_{TH2}$. The second comparator 210 may generate a second comparator output that indicates the result of the comparison. For example, if the battery voltage $V_B$ is greater than the second threshold voltage $V_{TH2}$, then the second comparator 210 may output a digital 1. Conversely, if the battery voltage $V_B$ is less than the second threshold voltage $V_{TH2}$, then the second comparator 210 may output a digital 0.

In an exemplary embodiment, if the battery voltage $V_B$ is greater than the first threshold voltage $V_{TH1}$, this means that the over-charge event is the type-1 over-charge event (excessively high battery voltage). If the battery voltage $V_B$ is less than the first threshold voltage $V_{TH1}$, this means that the over-charge event is the type-2 over-charge event (excessively high current). Therefore, a digital output 1 indicates the type-1 over-charge event and a digital output 0 indicates the type-2 over-charge event.

In addition, if the battery voltage $V_B$ is greater than the second threshold voltage $V_{TH2}$, this means the over-discharge event is the type-2 over-discharge event (excessively high current). If the battery voltage $V_B$ is less than the second threshold voltage $V_{TH2}$, this means the over-discharge event is the type-1 over-discharge event (under-voltage). Therefore, a digital output 1 indicates the type-2 over-discharge event and a digital output 0 indicates the type-1 over-discharge event.

In various embodiments, the first and second threshold voltages $V_{TH1}$, $V_{TH2}$ may be predetermined values and may be based on the particular operating specifications for a particular battery. For example, if a battery has a rated maximum voltage of 4.0V, then the first threshold voltage $V_{TH1}$ may be set to 3.7V and the second threshold voltage $V_{TH2}$ may be set to 0.5V.

The comparators may comprise conventional comparator circuits, or any other circuit suitable for comparing two values and generating an output indicating the result of the comparison.

The memory 235 may be configured to count and record various battery data. For example, the memory 235 may comprise a plurality of counters, such as a first counter 215, a second counter 220, a third counter 225, and a fourth counter 230. Each counter may be configured to count (increment by one) each instance of a particular input and store (record) a corresponding value.

In an exemplary embodiment, the first and second counters 215, 220 may be connected to the output of the first comparator 205 and receive the first comparator output as an input. The first counter 215 may be configured to count the instances of a first comparator output of 1. In other words, the first counter 215 counts the instances of the type-1 over-charge event, and thus, has a first count value corresponding to the total number of type-1 over-charge events. The second counter 220 may be configured to count the instances of a first comparator output of 0. In other words, the second counter 220 counts the instances of the type-2 over-charge event, and thus, has a second count value corresponding to the total number of type-2 over-charge events.

In an exemplary embodiment, the third and fourth counters 225, 230 may be connected to the output of the second comparator 210 and receive the second comparator output as an input. The third counter 225 may be configured to count the instances of a second comparator output of 1. In other words, the third counter 225 counts the instances of the type-2 over-discharge event, and thus, has a third count value corresponding to the total number of type-2 over-discharge events. The fourth counter 230 may be configured to count instances of a second comparator output of 0. In other words, the fourth counter 230 counts the instances of the type-1 over-discharge event, and thus has a fourth count value corresponding to the total number of type-1 over-discharge events.

The memory 235 may comprise any suitable memory type, such as a flash memory or any other memory-based counter circuit.

The fuel gauge circuit 130 may further comprise an output control circuit configured to generate and transmit a control signal, such as a first output control circuit 240 and a second output control circuit 245. The first output control circuit 240 may be configured to generate a third control signal OUT1 that enables a self-discharge operation based on information from the second protection circuit 140 and information related to confirmation of an over-charge event. For example, the first output control circuit 240 may be connected to the output terminal of the first comparator 205 and receive the first comparator output result. The first output control circuit 240 may also be connected to the second protection control circuit 140 and receive the first control signal COUT2=0. In an exemplary embodiment, the first output control circuit 240 may generate the third control signal OUT1 if the first comparator 205 confirms a type-1 over-charge event (as described above) and the second protection control circuit 140 generates the first control signal COUT2=0. The first output control circuit 240 may transmit the third control signal OUT1 to the recovery control device 145.

The second output control circuit 245 may be configured to generate a fourth control signal OUT2 that enables a charging operation based on information from the second protection circuit 140 and information related to confirmation of an over-discharge event. For example, the second output control circuit 245 may be connected to the output terminal of the second comparator 210 and receive the second comparator output result. The second output control circuit 245 may also be connected to the second protection control circuit 140 and receive the second control signal DOUT2=0. In an exemplary embodiment, the second output control circuit 245 may generate the fourth control signal OUT2 if the second comparator 210 confirms a type-1 over-discharge event (as described above) and the second protection control circuit 140 generates the second control signal DOUT2=0. The second output control circuit 245 may transmit the fourth control signal to the charger 115. The charger 115 may begin a charging operation in response to the fourth control signal.

The recovery control device 145 may be configured to enable the self-discharging operation in response to the third control signal OUT1. For example, the third control signal OUT1 may enable (turn ON) the recovery control device 145, which provides a current path to discharge the battery 120.

The recovery control device 145 may comprise any switch device suitable for enabling/disabling a current path. In an exemplary embodiment, the recovery control device 145 may comprise a field-effect transistor (FET) comprising a gate terminal connected to the fuel gauge circuit 130 and responsive to the third control signal OUT1, a source terminal connected to a first terminal (e.g., a positive terminal) of the battery 120 and the first terminal 170 of the battery pack 105, and a drain terminal connected to a second terminal (e.g., a negative terminal) of the battery 120 and the fourth terminal 185 of the battery pack. In an exemplary embodiment, the recover control device 145 comprises a p-type FET.

In one embodiment, the third control signal OUT1 may be applied directly to the gate terminal to enable the FET. Alternatively, the third control signal OUT1 may indirectly enable the FET via a pulse-width modulator circuit (not shown) that receives the third output control signal OUT1 and generates a pulse-width modulated signal having a variable PWM ratio that is applied directly to the FET. The PWM ratio may be dynamically selected based on the difference (Δ) between the measured battery voltage $V_B$ and the first threshold voltage $V_{TH1}$ (i.e., $\Delta = V_{TH1} - V_B$). For example, the larger the difference, the higher the PWM ratio. As the PWM ratio increase, the charging period also increases.

In various embodiments, the battery pack 105 may further comprise a temperature sensor, such as a thermistor 125, suitably configured to monitor and report the temperature of the battery 120 and/or battery pack 130. The thermistor 125 may generate a voltage that corresponds to a temperature of the battery 120 and/or battery pack 130, and transmit the voltage to the fuel gauge circuit 130. The fuel gauge circuit 130 may use the measured temperature to determine the battery state of charge, internal resistance of the battery, and other parameters that are affected by temperature.

In operation, and referring to FIGS. 1-7, the protection control circuits 135, 140 each monitor the voltage and current of the battery pack 102. If either protection control circuit detects excessive voltage or excessive current during a charging operation, the protection control circuit 135, 140 disables the respective charge control device 155, 165 via the first control signal COUT to prevent current flow. The first control signal COUT, however does not provide the fuel gauge circuit 130 with information relating to whether the over-charge event was due to current (i.e., the type-2 over-charge event) or voltage (i.e., the type-1 over-charge event). If either protection control circuit detects excessive voltage or excessive current during a discharging operation, the protection control circuit disables the respective discharge control device via the second control signal DOUT to prevent current flow. The second control signal DOUT, however does not provide the fuel gauge circuit 130 with information relating to whether the over-discharge event was due to current (i.e., the type-2 over-discharge event) or voltage (i.e., the type-1 over-discharge event)

In an exemplary operation, the second protection control circuit 140 also transmits the first and second control signals COUT2, DOUT2 to the fuel gauge circuit 130 so that the fuel gauge circuit 130 can confirm or otherwise verify the over-charge event or over-discharge event and determine the type of event. At the same time, the fuel gauge circuit 130 may also be independently monitoring the voltage $V_B$ of the battery 120 as well as the first and second control signals COUT2, DOUT2.

If the fuel gauge circuit receives COUT2=0 (600), then the fuel gauge circuit 130 may perform a comparison of the battery voltage $V_B$ and the first threshold voltage $V_{TH1}$ (605), for example, using the first comparator 205. If the battery voltage $V_B$ is greater than the first threshold voltage $V_{TH1}$, then the COMP1=1 (610), which indicates a type-1 over-charge event, and in turn, increments the first counter 215 (620). In addition, the first output control circuit 240 may receive the first control signal and the first comparator output COUT2 and if the first comparator output equals 1 and the first control signal COUT2 equals 0, then the output control circuit 240 may enable the self-discharge operation by turning ON the recover control device, thus providing a current path to discharge the battery 120. The self-discharging operation may continue until the battery voltage $V_B$ is less than the first threshold voltage $V_{TH1}$.

If the battery voltage $V_B$ is not greater than the first threshold voltage $V_{TH1}$, then COMP1=0, which indicates a type-2 over-charge event, and in turn increments the second counter 220 (630). Both the first and second counters 215, 220 may transmit their respective count values to the host device 110 (635).

If the fuel gauge circuit receives DOUT2=0 (700), then the fuel gauge circuit 130 may perform a comparison of the battery voltage $V_B$ and the second threshold voltage $V_{TH2}$ (705), for example, using the second comparator 210. If the battery voltage $V_B$ is not greater than the second threshold voltage $V_{TH2}$, then the COMP2=0 (710), which indicates a type-1 over-discharge event, and in turn, increments the fourth counter 230 (720). In addition, the second output control circuit 245 may receive the second control signal DOUT2 and the second comparator output COMP2, and if the second comparator output equals 0 and the second control signal DOUT2 equals 0, then the second output control circuit 245 may transmit a signal to the charger 115, which activates the charging operation (725). The charging operation may continue until the battery voltage $V_B$ is greater than the second threshold voltage $V_{TH2}$.

If the battery voltage $V_B$ is greater than the second threshold voltage $V_{TH2}$, then COMP2=1, which indicates a type-2 over-discharge event, and in turn increments the third counter 225 (730). Both the third and fourth counters 225, 230 may transmit their respective count values to the host device 110 (735).

It should be noted that the particular values of various signals, such as COUT2, DOUT2, COMP1, COMP2, may differ from those described above. For example, the second protection control circuit 140 may generate COUT2=1 to turn OFF the charge control device 165 and may generate DOUT2=1 to turn OFF the discharge control device 160. In addition, the first comparator 205 may be configured to output a 0 if the battery voltage $V_B$ is greater than the first threshold voltage $V_{TH1}$, and may output a 1 if the battery voltage $V_B$ is not greater than the first threshold voltage. Similarly, the second comparator 210 may be configured to output a 1 if the battery voltage $V_B$ is not greater than the second threshold voltage $V_{TH2}$ and output a 0 if the battery voltage $V_B$ is greater than the second threshold voltage $V_{TH2}$.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An apparatus capable of connecting to a battery, comprising:
   a protection control circuit connected to the battery and configured to:
   detect an over-charge event and generate a first control signal in response to the detected over-charge event; and
   detect an over-discharge event and generate a second control signal in response to the detected over-discharge event;
   a charge control device responsive to the first control signal;
   a discharge control device responsive to the second control signal;
   a fuel gauge circuit connected to the battery and in communication with the protection control circuit and configured to:
   confirm the over-charge event in response to the first control signal;
   count and record a total number of confirmed over-charge events;
   confirm the over-discharge event in response to the second control signal; and
   count and record a total number of confirmed over-discharge events; and
   a recovery control device configured to discharge the battery in response to the confirmed over-charge event.

2. The apparatus according to claim 1, wherein:
   the over-charge event comprises over-current charging and over-voltage charging; and
   the over-discharge event comprises over-current discharging and under-voltage discharging.

3. The apparatus according to claim 1, wherein: the fuel gauge circuit comprises:
   a voltage sensor to detect a voltage of the battery;
   a first comparator to compare the voltage of the battery with a first predetermined threshold voltage, wherein the first comparator confirms the over-charge event and generates a third control signal; and
   a second comparator to compare the voltage of the battery with a second predetermined threshold voltage, wherein the second comparator confirms the over-discharge event and generates a fourth control signal.

4. The apparatus according to claim 3, wherein the fuel gauge circuit further comprises:
   a first output control circuit configured to generate the third control signal in response to the first comparator output and the first control signal; and
   a second output control circuit configured to generate the fourth control signal in response to the second comparator output and the second control signal.

5. The apparatus according to claim 1, wherein the fuel gauge circuit comprises:
   a first counter configured to count the number of over-charge events and output a first count value corresponding to the total number of confirmed over-charge events; and
   a second counter configured to count the number of over-discharge events and output the second count value corresponding to the total number of confirmed over-discharge events.

6. The apparatus according to claim 1, wherein the fuel gauge circuit is further configured to:
   generate a third control signal in response to the confirmed over-charge event, wherein the recovery control device is responsive to the third control signal; and
   generate a fourth control signal in response to the confirmed over-discharge event, wherein the fourth control signal starts a charging operation.

7. The apparatus according to claim 1, wherein the battery, the protection control circuit, recovery control device, and the fuel gauge circuit are arranged in a single physical package, and wherein the physical package comprises:
   a first terminal having a supply voltage level and connected to the battery, the fuel gauge circuit, and the recovery control device;
   a second terminal configured for data communication and connected to the fuel gauge circuit;
   a third terminal configured to transmit a fourth control signal and connected to the fuel gauge circuit; and
   a fourth terminal having a reference voltage level and connected to the charge control device.

8. The apparatus according to claim 1, wherein the recovery control device comprises a field-effect transistor comprising:
   a gate terminal connected to the fuel gauge circuit and responsive to a third control signal;
   a source terminal connected to a first terminal of the battery; and a drain terminal connected to a second terminal of the battery.

9. A method for managing over-charging and over-discharging events in a battery, comprising:
   detecting an over-charge event and generating a first control signal in response to the detected over-charge event;
   detecting an over-discharge event and generating a second control signal in response to the detected over-discharge event;
   confirming the over-charge event in response to the first control signal;
   performing a self-discharging operation in response to the confirmed over-charge event;
   confirming the over-discharge event in response to the second control signal;
   performing a charging operation in response to the confirmed over-discharge event;
   counting a number of confirmed over-charge events and outputting a first count value corresponding to the number of confirmed over-charge events;
   counting a number of confirmed over-discharge events and outputting a second count value corresponding to the number of confirmed over-discharge events; and
   storing the first count value and the second count value.

10. The method according to claim 9, wherein confirming the over-charge event comprises:
   measuring a voltage of the battery; and
   comparing the measured voltage of the battery to a first predetermined threshold voltage.

11. The method according to claim 10, wherein performing the self-discharging operation in response to the confirmed over-charge event comprises:
   generating a third control signal according to the comparison of the measured voltage and the first predetermined threshold voltage;
   transmitting the third control signal to a recovery control device configured to discharge the battery in response to the third control signal.

12. The method according to claim 9, wherein confirming the over-discharge event comprises:
   measuring a voltage of the battery; and
   comparing the measured voltage to a second predetermined threshold voltage.

13. The method according to claim 12, wherein performing the self-charging operation in response to the confirmed over-discharge event comprises:
   generating a fourth control signal according to the comparison of the measured voltage and the second predetermined threshold voltage; and
   transmitting the fourth control signal to a charger device configured to charge the battery in response to the fourth control signal.

14. A system, comprising:
   a host device;
   a charger; and
   a battery pack connected to the host device via a first I/O terminal, a second I/O terminal, and a third I/O terminal and connected to the charger via a fourth I/O terminal, wherein the battery pack comprises:
      a protection control circuit configured to:
         detect an over-charge event and generate a first control signal in response to the detected over-charge event; and
         detect an over-discharge event and generate a second control signal in response to the detected over-discharge event; and
      a fuel gauge circuit configured to receive the first control signal and second control signal and comprising:
         a voltage sensor to detect a voltage of the battery;
         a comparator system connected to the voltage sensor and configured to:
            compare the detected voltage with a first predetermined voltage and generate a first comparator output according to the comparison, wherein the first comparator output indicates whether the detected over-charge event is a type-1 over-charge event or a type-2 over-charge event; and
            compare the detected voltage with a second predetermined voltage and generate a second comparator output according to the comparison, wherein the second comparator output indicates whether the detected over-discharge event is a type-1 over-discharge event or a type-2 over-discharge event;
         a plurality of counters connected to an output of the comparator system and configured to count a number of type-1 over-charge events and generate a corresponding first count value, count a number of type-2 over-charge events and generate a corresponding second count value, count a number of type-1 over-discharge events and generate a corresponding third count value, and count a number of type-2 over-discharge events and generate a corresponding fourth count value; wherein the plurality of counters is further configured to transmit the first, second, third, and fourth count values to the host device; and
         a recovery control device connected to the fuel gauge circuit and configured to provide a self-discharging operation in response to the type-1 over-charge event.

15. The system according to claim 14, wherein:
   the over-charge event is the type-1 over-charge event if the detected voltage is greater than a first predetermined threshold voltage;
   the over-charge event is the type-2 over-charge event if the detected voltage is less than the first predetermined threshold voltage;
   the over-discharge event is the type-1 over-discharge event if the voltage is less than a second predetermined threshold voltage; and
   the over-discharge event is the type-2 over-discharge event if the voltage is greater than the second predetermined threshold voltage.

16. The system according to claim 14, wherein the recovery control device comprises a field-effect transistor comprising:
   a gate terminal connected to the fuel gauge circuit and responsive to a third control signal;
   a source terminal connected to a first terminal of the battery; and
   a drain terminal connected to a second terminal of the battery.

17. The system according to claim 14, wherein the charger is configured to charge the battery in response to the type-1 over-discharge event.

18. The system according to claim 14, wherein the fuel gauge circuit further comprises:
   a first output control circuit configured to generate a third control signal in response to the type-1 over-charge event and the first control signal; and a second output control circuit configured to generate a fourth control signal in response to the type-1 over-discharge event and the second control signal.

19. The system according to claim 14, wherein the battery pack further comprises:
- a charge control device connected between the host system and the battery and responsive to the first control signal; and
- a discharge control device connected between the host system and the battery and responsive to the second control signal.

* * * * *